June 9, 1953

R. L. SKINNER 2,641,241

OIL-CONTROL MEANS FOR SLIDE VALVE
INTERNAL-COMBUSTION ENGINES

Filed April 17, 1948

INVENTOR.
Ralph L. Skinner.
BY
Harness, Dickey & Pierce.
ATTORNEYS.

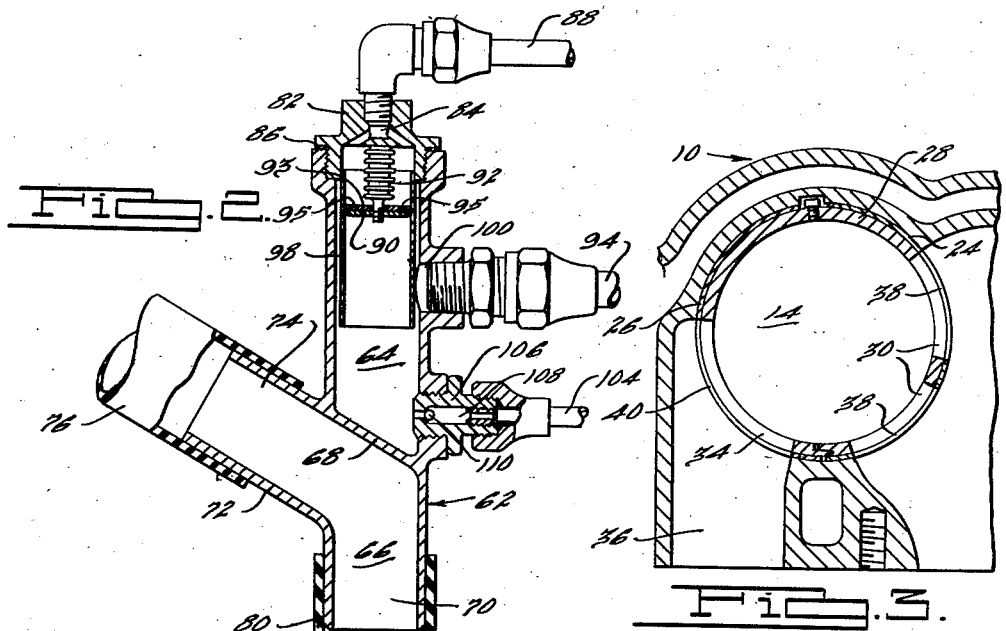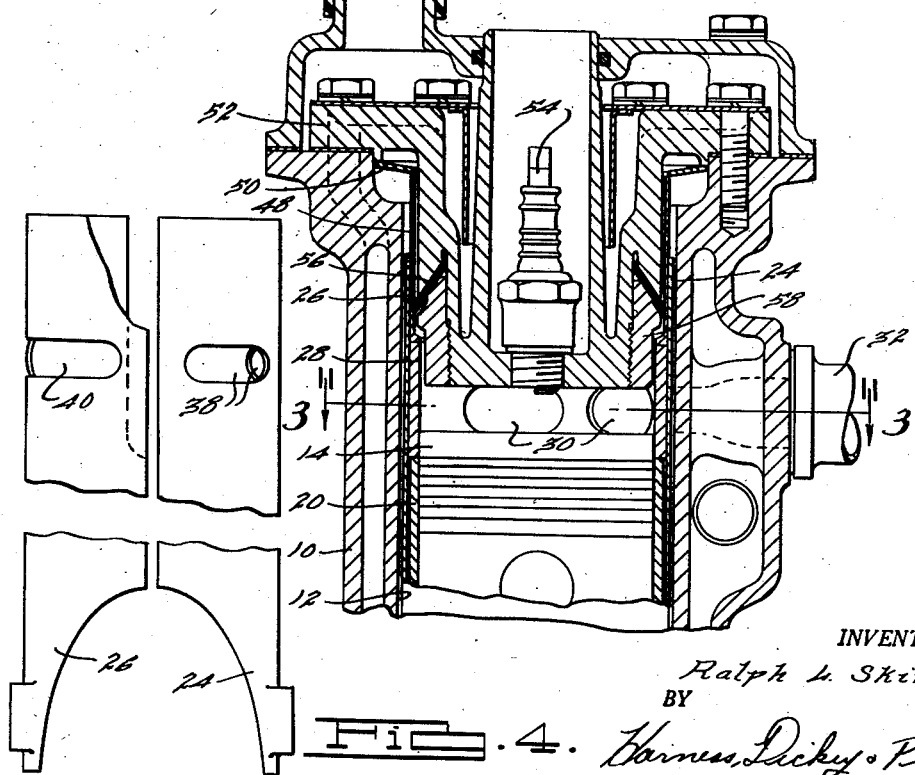

UNITED STATES PATENT OFFICE 2,641,241

OIL-CONTROL MEANS FOR SLIDE VALVE INTERNAL-COMBUSTION ENGINES

Ralph L. Skinner, Detroit, Mich.

Application April 17, 1948, Serial No. 21,643

5 Claims. (Cl. 123—196)

This invention relates broadly to new and useful improvements in oil-control means for internal-combustion engines and more particularly to a means of this character which is primarily intended and pre-eminently suited though not limited to use on engines of the slide-valve type.

Oil pressure in the lubricating system of the engine and oil thrown off at the connecting rod and main bearings and/or agitated by rapidly revolving engine parts causes a heavy vapor or mist of oil to be constantly circulated in the crankcase itself. This vapor or mist condenses on the exposed surfaces of the valves and other parts. The majority of the oil is again returned to the oiling system of the engines. This oil ultimately works its way into the firing chambers and is burned. Oil loss is particularly aggravated in the case of slide-valve engines since the lower portions of the valves actually extend into and operate in the crankcase. As there are two valves for each cylinder, the total valve surface exposed to oil vapors or mist in the crankcase is substantial. Oil vapors or mist accumulates on both the inner and outer surfaces of the slide valves as well as the adjacent bearing surfaces. This oil creeps upwardly on the valves to the inlet and exhaust ports of the engine and thence into the firing chambers where it is burned. Not only does the above phenomena result in excessive oil consumption, but oil gaining access to the firing chambers causes objectionable smoke and vapors and produces excessive and detrimental deposits on the engine parts.

In addition to the above, a considerable amount of oil seeps or is forced out of the engine through the front and rear main bearings which support the crankshaft even though packing means are provided or through other openings, joints or gaskets in the oil-circulating system. Loss of oil in this manner manifestly becomes worse as the engine becomes older and the parts become worn. Apparently this phenomenon is due at least partially to a build-up of pressures higher than atmosphere in the crankcase due to "blow-by" or other causes and to the oil working along the revolving shafts.

From the foregoing it will be at once apparent that oil economy is a very real, if not vital, problem in all types of engines and that this problem is particularly pronounced in slide-valve engines. Various answers to the problem have been suggested from time to time; but, to my knowledge, no one has heretofore developed a slide-valve engine that will compare favorably with poppet valve or other types of engines from the standpoint of oil consumption.

I have now discovered that oil consumption of internal-combustion engines can be drastically reduced by maintaining a vacuum in the entire crankcase so that all of the internal parts and surfaces of the engine are subject to a reduction in pressure during operation of the engine. By maintaining this vacuum I increase the oil economy of slide-valve engines to such an extent that they compare favorably with poppet valve or other types of engines. At the same time quieter operation and other advantages inherent in slide-valve engines are retained. Creepage of oil past the pistons and valves is greatly reduced, and loss of oil through the main bearings and other relatively tight openings is substantially eliminated.

Also, in internal-combustion engines "blow-by" past the pistons produces certain destructive and detrimental effects in the crankcase. For example, the blow-by gases dilute the lubricating oil and may reduce the lubricity characteristics of the lubricant to such an extent that excessive wear of bearing surfaces or moving parts occurs.

To eliminate this dilution or contamination, crankcase ventilation systems are conventionally provided on all engines, which ventilation systems constantly remove the blow-by gases from the crankcase by suction and introduce fresh air into the crankcase to accelerate the motion of the air therethrough. In introducing this air, the moisture content of the air condenses upon contact with the metal parts of the engine, and eventually this moisture mixes with the oil in the engine lubricating system, causing objectionable sludge, emulsion, and in very cold weather the moisture often freezes. The freezing renders the oil pump and other parts inoperative, and serious damage often results.

As a special application of the invention, I withdraw oil and blow-by vapors containing fuel and moisture contaminants from the crankcase and separate the fractions in a special distilling or fractionating chamber. The separated blow-by gases are conducted continuously to the intake manifold for reburning and the separated oil moiety is returned at intervals to the crankcase. The vapors preferably are withdrawn from the crankcase by means of a vacuum and the same vacuum source used to reduce the pressure in the crankcase may be used for this purpose. I prefer to use the vacuum in the intake manifold to reduce the pressure in the crankcase and also to withdraw the vapors from the crankcase; however, a separate vacuum pump may be employed for either or both of these operations, if desired.

From the foregoing it will be readily apparent that an important object of the present invention is to provide an oil-control means that can be readily adapted to slide-valve engines of conventional construction which will substantially reduce oil consumption and effect a substantial increase in fuel economy.

Another object of the invention is to provide an oil-control means of the above-mentioned character that assures proper lubrication of the engine, but at the same time prevents excess oil from by-passing the slide valves to the firing chambers.

Still another object of the invention is to provide a control means of the above-mentioned character that is operative automatically and continuously during operation of the vehicle to return blow-by gases to the firing chambers where they are blended with fresh fuel from the carburetor and burned in the conventional manner.

A further object of the invention is to provide a control means of the above-mentioned character that, by returning the blow-by gases to the fuel-supply system of the vehicle, prevents dilution of the lubricant in the crankcase and consequential detrimental effects resulting therefrom.

Other objects and advantages of the invention will be apparent during the course of the following description.

In the drawing forming a part of this specification and wherein like numerals are employed to designate like parts throughout the same:

Fig. 2 is an enlarged vertical, transverse sectional view showing the upper portion of the engine and a fragmentary portion of the oil-control means embodying the instant invention associated therewith;

Fig. 3 is a fragmentary, horizontal sectional view taken on the line 3—3 of Fig. 2; and Fig. 4 is an exploded elevational view of the two slide valves which control each cylinder of the engine.

Figure 1:
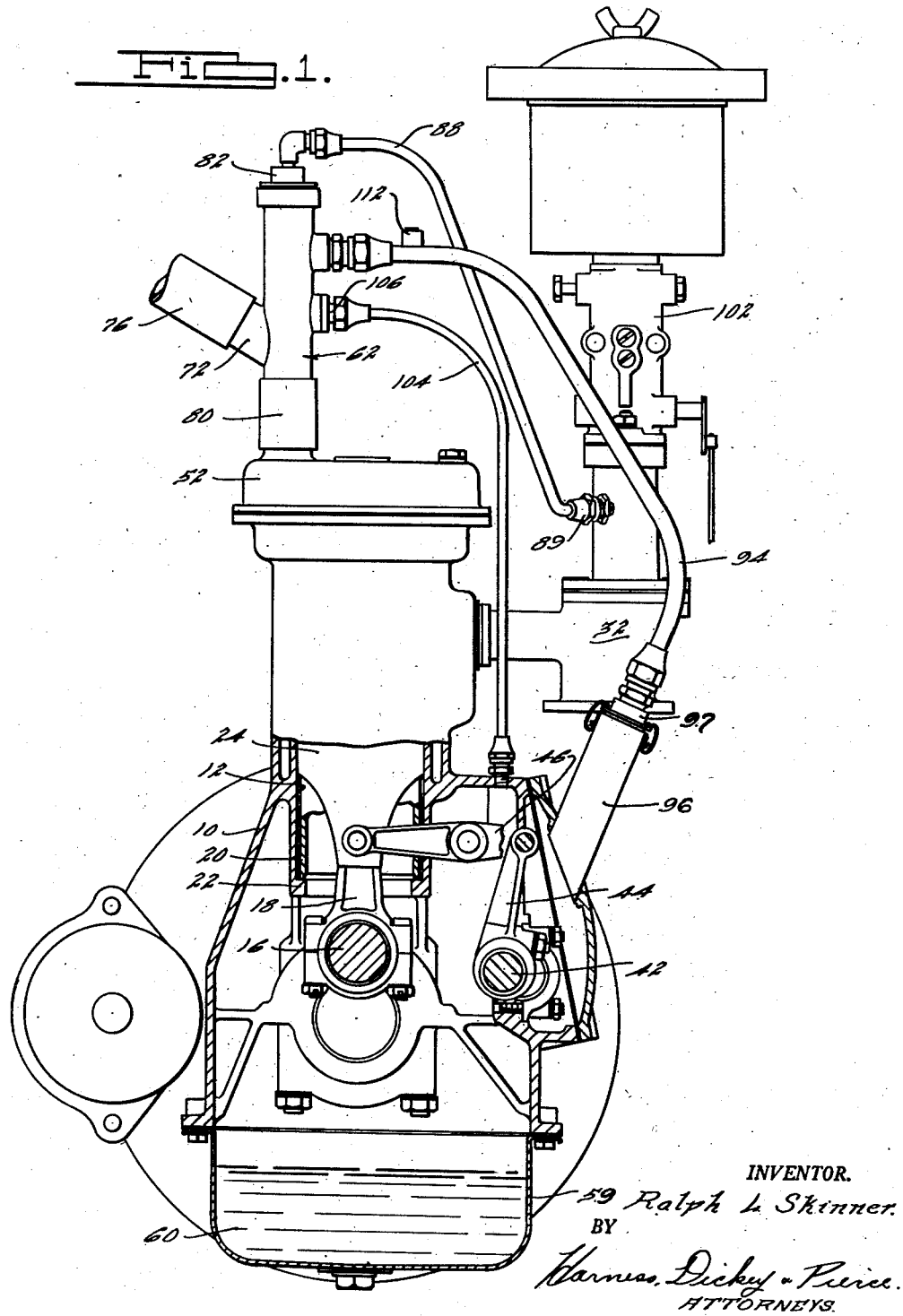
Fig. 1 is a front elevational view of a conventional side-valve engine equipped with a fuel-control means embodying the present invention, parts of the engine being broken away, and shown in section for clearness of illustration.

The slide-valve engine shown in the drawing is more or less conventional in construction and comprises the usual waterjacketed cylinder and crankcase assembly 10 having a plurality of cylinders 12. Pistons 14 are mounted for reciprocation in the cylinders 12 and drive a crankshaft 16 in the conventional manner through the medium of connecting rods 18.

Mounted within each of the cylinders 12 is an inner cylinder or sleeve 20 which rests upon an inturned annular flange 22 and terminates below the inlet and outlet ports of the cylinder 12. As perhaps best shown in Fig. 2, the inner cylinders 20 fit snugly around the power pistons 14 and are spaced circumferentially from the outer cylinders 12 to accommodate the usual slide valves 24 and 26 (Fig. 4).

Surmounting the inner cylinder 20 is a longitudinally split, expansible and contractible, ported sealing ring 28 having a bridged inlet port 30 which is adapted to receive fuel from the intake manifold 32 and an exhaust port 34 which communicates with the discharge manifold 36. Slide valve 24 is provided with a bridged inlet port 38 and slide valve 26 is formed with an exhaust port 40, which inlet and exhaust ports are adapted to register with the inlet port 30 and exhaust port 34 respectively. As will be readily apparent to those skilled in the art, the slide valves are reciprocably actuated in properly timed relation by a valve shaft 42 through the medium of connecting rods 44 and rockshafts 46 to control the firing chambers.

Each inner cylinder 20 and its superposed sealing ring 28 is held stationary by a hold-down ring 48 and an annular spring 50. In this connection, it will be observed that the hold-down ring 48 is disposed above and seats downwardly on the sealing ring 28 and that the spring 50 is confined between the hold-down ring and the cylinder head 52. The spring 50 here shown is of the "Belleville" type and is conventionally employed in this type of engine.

A spark plug 54 is mounted in the cylinder head 52 centrally of each firing chamber, and the latter is sealed above the piston 14 in the usual manner by a plurality of frusto-conical nested flexible reeds 56. The reeds 56 are clamped between a portion of the cylinder head 52 and a threaded collar 58 in such manner that the outer peripheral edges thereof engage and effect a fluid-tight seal with the hold-down ring 48.

The lower portion of the cylinder and crankcase assembly 10 carries the usual oil pan 59, and the latter is adapted to contain a quantity of lubricating oil 60.

In engines of this type there has been a marked tendency heretofore for the lubricating oil 60 to work upwardly along the slide valves 24 and 26 to the inlet and exhaust openings of the firing chambers. Since this oil enters the firing chambers and is burned, an excessive amount of oil is used. Moreover, the presence of the oil in the firing chambers causes objectionable smoke and produces a variety of objectionable and detrimental effects.

In addition to the above, there is a tendency in all types of engines for combustion gases to blow downwardly past the power pistons 14 into the crankcase and this tendency increases as the engine becomes older and the parts become worn. The blow-by gases dilute the oil 60 to such an extent that its lubricating characteristics are impaired and excessive wear of the engine parts occurs.

The present invention is concerned primarily with means for obviating the adverse conditions referred to above. In carrying out the invention, a partial vacuum is created in the crankcase and associated parts of the engine so that pressure on all of the exposed internal parts of the engine is reduced. In this connection it will be readily apparent that the crankcase and the oiling system of the engine should be made substantially airtight in order to maintain a substantial vacuum in the engine; however, a substantial benefit is achieved if the engine is not sealed and the pressure is reduced only slightly. Even a slight reduction of pressure in the crankcase will prevent pressure from building up in excess of atmospheric pressure due to blow-by or other causes and thus will prevent or at least drastically retard leakage past the main bearings and other points of escape. For maximum benefit, however, the crankcase should be sealed. This may be done in any suitable manner as by means disclosed in my prior Patent No. 1,415,060 which issued May 9, 1922. A sealed cap or other closure should be provided for the oil filler tube, and occasionally special seals may be provided for the main crankshaft bearings. In practice, the crankcase may be placed in communication with the intake manifold of the engine as this will produce a sufficient reduction in pressure to achieve the objects of my invention. If the crankcase is properly sealed, the pressure in the crankcase will be only slightly greater than in the intake manifold during operation of the engine. If this is done, however, the pressure in the crankcase will vary as the pressure in the manifold. Usually this is not objectionable. Under some circumstances it may be desirable to maintain a uniform reduced pressure in the crankcase, and a vacuum pump may then be used as the vacuum source in place of the intake manifold.

As suggested, I also provide the engine with means for drawing oil vapors and blow-by gases from the crankcase, separating the two constituents and ultimately returning the oil to the crankcase while simultaneously directing the blow-by gases to the intake manifold for redistribution to the various firing chambers. Prolonged tests under actual service conditions have demonstrated that the present invention effects a substantial saving of oil and a material increase in fuel economy. In the case of slide-valve engines I have increased the oil economy from four to ten times by application of the principles referred to above and hereinafter described in detail.

More particularly, I provide a generally cylindrical, vertically elongated metal casing or housing 62 which has upper and lower chambers 64 and 66 separated by an inclined, transverse partition 68. The lower end of housing 62 is open to provide an inlet 70 for the lower chamber 66. Also, it will be observed that the housing 62 is formed with a branch extension 72 which provides an outlet 74 for the lower chamber 66.

In conventional practice, a hose 76 is fastened over a boss 78 on the cylinder head 52, which boss forms an outlet for the water jacket through which water is circulated constantly during operation of the vehicle to cool the engine. Relatively cool water from the radiator is charged to the water jacket, and heated water from the jacket is returned to the radiator through the hose 76.

According to the present invention, the housing 62 is interposed between the hose 76 and the boss 78 as shown in Fig. 2. The lower portion 70 of the housing is attached to the boss 78 in any suitable manner as by a flexible coupling 80, and the hose 76 is slipped over the branch outlet 72.

Thus, during operation of the vehicle, heated water from the engine flows constantly through the lower chamber 66 and across the partition 68. The housing 62 is formed of metal or other heat-conductive material and the water flowing through the lower chamber 66 heats the partition 68 and maintains the lower portion of the upper chamber 64 in a heated condition at all times.

Screwed into the upper end of housing 62 is a cap 82 which has a centrally located outlet port 84. A sealing gasket 86 between cap 82 and the end of housing 62 effects a fluidtight joint therebetween. A tube 88 extends from the outlet port 84 and is connected to the riser of intake manifold 32 by a coupling 89 so that the manifold may be used to create a vacuum in the upper chamber 64.

For maximum efficiency in operation, communication between the intake manifold 32 and chamber 64 should be shut off when the engine is started and for a short interval after it is started in order to permit the engine to fire and to come up to running speed. To this end I provide a valve 90 within chamber 64, which valve is carried by a conventional expandable and retractable metal bellows 92 commonly referred to in the trade as a "sylphon" and the valve 90 is adapted to seat upwardly against a ported, disk-shaped, closure plate 93. The "sylphon" 92 is fastened at its upper end to cap 82 centrally within an annular series of branch passages which connect the outlet port 84 with the chamber 64, and the valve 90 normally closes an annular series of holes 95 in the plate 93, as shown in Fig. 4.

When the engine is started, the parts are positioned as shown in the drawing. However, after the engine has fired and come up to running speed the pressure-sensitive "sylphon" 92 responds to a reduced pressure in the tube 88 to move valve 90 downwardly away from plate 93 and to open the holes 95 whereby the vacuum effect in tube 88 is transmitted to the entire chamber 64. Inasmuch as the sylphon 92 also is heat-sensitive, the heat in upper chamber 64 assists in holding the valve 90 open after the engine has operated long enough to heat the coolant which flows through the lower chamber 66. When the engine is turned off, the sylphon automatically closes valve 90 preparatory to the time the engine is again started.

Oil vapors and blow-by gases in the crankcase are conducted to chamber 64 by a tube 94. The latter may be connected to the crankcase at any point above the normal level of the lubricant 60 therein and preferably is connected to the housing 62 substantially midway between the top and bottom of chamber 64. In practice, the lower end of tube 94 conveniently can be connected to the conventional filler or vent pipe 96 by a suitable adapter or coupling designated generally by the numeral 97. In any event, the connection between tube 94 and pipe 96 should be fluidtight as this tube co-operates with the chamber 64 and tube 88 to establish communication between the intake manifold 32 and the crankcase. As a consequence, the crankcase and associated parts of the engine also are placed under vacuum.

An annular baffle 98 depends from cap 82 to a point below the side opening 100 which receives the upper end of tube 94. The baffle 98 is spaced circumferentially from the housing 62 and serves to deflect oil vapors and blow-by gases delivered to the chamber 64 by tube 94 downwardly to the bottom of the chamber. Also, in the form of the invention here shown by way of illustration, the ported transverse plate 93 is mounted within the baffle 98.

Since the lower portion of chamber 64 is heated, the relatively volatile blow-by gases are distilled and separated from the higher boiling oil vapors. In practice, the oil vapors accumulate in the bottom of chamber 64 and the blow-by gases pass upwardly past the open valve 90 through the perforations 95, into outlet port 84 and thence through the tube 88 to the intake manifold 32 where they are blended with fresh fuel from the carburetor 102 and again distributed to the various firing chambers of the engine.

Oil which accumulates in the lower portion of chamber 64 is returned to the crankcase through a tube 104. Preferably, a ball-check valve 106 is interposed between the housing 62 and the upper end of tubing 104, and in this connection it will be observed that the passage 108 through the check-valve assembly is located a slight distance above the bottom of chamber 64. As long as oil within the chamber 64 is below the passage 108, vacuum within the chamber will hold the ball element 110 closed. However, when the oil in chamber 64 rises to a predetermined level above passage 108, the ball element 110 falls away from its seat and permits a portion of the oil to drain back to the crankcase. After a portion of the oil has drained from chamber 64, the ball element 110 again seats and the cycle of operation is repeated.

At extremely high engine speeds it is possible that the vacuum in intake manifold 32 will be insufficient to overcome the pressure built up in crankcase 10 by blow-by gases. In order to permit crankcase breathing under these conditions, a relief valve 112 is provided. Relief valve 112 may be attached to the crankcase 10 or any part which communicates directly therewith. In the drawings, valve 112 is shown attached to tube 94 adjacent the housing 62 where it is readily accessible for inspection or cleaning.

Operation of the system is as follows:

When the engine is not in operation and when the engine is first started, the "sylphon" 92 holds valve 90 positioned to close the holes 95 in plate 93. However, a vacuum is created in intake manifold 32 immediately when the engine is started and this vacuum is extended in tube 88 as far as the valve 90. After the engine has fired and come up to running speed, the sylphon 92 opens valve 90 and thereby extends the vacuum to chamber 64, tube 94, and the sealed crankcase 10. Vacuum within the chamber 64 then causes the ball check 110 to close.

In connection with the above, it will be readily apparent that the vacuum in crankcase 10 and associated parts will be substantially equal to that created in the intake manifold 32. The entire interior of the engine including the surfaces of slide valves 24 and 26, the lower portions of pistons 14, and the annular passage above the slide valves which accommodates the spring 50 are all exposed to the vacuum.

The reduced pressure in the crankcase 10 to a degree prevents passage of excess oil by the piston rings and to a greater degree prevents the oil from passing upwardly along the slide valves 24 and 26 to the inlet and exhaust ports of the firing chambers. The vacuum in tube 94 also causes oil vapors in the crankcase and blow-by gases from the firing chambers to enter the heated refining chamber 64. Immediately upon entering chamber 64, the vapors strike against baffle 98 and are deflected downwardly into the heated lower portion of the chamber. The relatively volatile gasoline vapors rise in chamber 64 past valve 90 and through tube 88 to the intake manifold 32 in the manner hereinabove described while the oil vapors condense and accumulate in the bottom of the chamber. As soon as sufficient oil collects in chamber 64 to overcome the check valve 106, ball element 110 falls from its seat and allows the undiluted oil to return to crankcase 10. This process is continuous and automatic.

It is to be understood that the form of the invention herewith shown and described is to be taken as a preferred example of the same and that various changes in the size, shape, and arrangement of parts may be resorted to without departing from the spirit of the invention or the scope of the appended claims.

Having thus described the invention, I claim:

1. An internal-combustion engine having a sealed crankcase, cylinders mounted on said crankcase and providing combustion chambers having inlet and exhaust ports, each cylinder comprising concentric cylinder members providing spaced inner and outer walls, a fuel intake system which supplies fuel to the combustion chambers of the engine and is normally under vacuum during operation of the engine, and a pair of substantially semicylindrical slide valves for each combustion chamber mounted for reciprocation between said inner and outer walls and controlling the inlet and exhaust ports of the combustion chambers, the two valves in each pair extending longitudinally of the cylinder and downwardly into the crankcase and being separated at the longitudinal edges thereof so that the edges of the valves are exposed to conditions in the crankcase, and means interconnecting said fuel intake system and the crankcase so that substantially the same vacuum is maintained in the crankcase and on the surfaces of the valves as is maintained in the fuel intake system.

2. In an internal-combustion engine of the class having a crankcase, cylinders mounted on said crankcase providing combustion chambers having inlet and exhaust ports, each cylinder comprising concentric cylinder members providing spaced inner and outer annular walls, a pair of substantially semicylindrical slide valves for each combustion chamber mounted for reciprocation between said inner and outer walls and controlling the inlet and exhaust ports of the combustion chamber, the two slide valves in each pair extending longitudinally of the cylinder and downwardly into the crankcase and being separated at the longitudinal edges thereof to define longitudinal passages therebetween, said longitudinal passages extending the full length of the valves and communicating with the crankcase, the combination with said crankcase and said slide valves of a vacuum producer connected to the crankcase for reducing the pressure in the crankcase, in the longitudinal passages between the slide valves and thence simultaneously to the entire inner and outer surfaces of the valves from the longitudinal edges thereof, said reduction of pressure on the surfaces of the valves being operative to inhibit passage of oil from the crankcase to the combustion chambers past the valves due to pressure differential normally obtaining in the crankcase and in the combustion chambers of the engine and due to reciprocation of the valves in use.

3. In an internal-combustion engine having a crankcase, cylinders mounted on said crankcase and providing combustion chambers having inlet and exhaust ports, each cylinder comprising concentric cylinder members providing spaced inner and outer walls, a fuel intake system which supplies fuel to the combustion chambers of the engine and is normally under vacuum during operation of the engine, and a pair of substantially semicylindrical slide valves for each combustion chamber mounted for reciprocation between said inner and outer walls and controlling the inlet and exhaust ports of the combustion chambers, the two valves in each pair extending longitudinally of the cylinder and downwardly into the crankcase and being separated at the longitudinal edges thereof so that the edges of the valves are exposed to conditions in the crankcase, means interconnecting said fuel intake system and the crankcase so that substantially the same vacuum is maintained in the crankcase and on the surfaces of the valves as is maintained in the fuel intake system, and means for collecting and accumulating oil vapors withdrawn from the crankcase by said last-mentioned means.

4. In an internal-combustion engine having a crankcase, cylinders mounted on said crankcase and providing combustion chambers having inlet and exhaust ports, each cylinder comprising concentric cylinder members providing spaced inner and outer walls, a fuel intake system which supplies fuel to the combustion chambers of the engine and is normally under vacuum during operation of the engine, and a pair of substantially semicylindrical slide valves for each combustion chamber mounted for reciprocation between said inner and outer walls and controlling the inlet and exhaust ports of the combustion chambers, the two valves in each pair extending longitudinally of the cylinder and downwardly into the crankcase and being separated at the longitudinal edges thereof so that the edges of the valves are exposed to conditions in the crankcase, means interconnecting said fuel intake system and the crankcase so that substantially the same vacuum is maintained in the crankcase and on the surfaces of the valves as is maintained in the fuel intake system, means for collecting and accumulating oil vapors withdrawn from the crankcase by said last-mentioned means, and means for returning oil so collected and accumulated back to the crankcase.

5. An internal-combustion engine having a crankcase, cylinders mounted on said crankcase and providing combustion chambers having inlet and exhaust ports, each cylinder comprising concentric cylinder members providing spaced inner and outer walls, a pair of substantially semicylindrical slide valves for each combustion chamber mounted for reciprocation between said inner and outer walls and controlling the inlet and exhaust ports of the combustion chambers, the two valves in each pair extending longitudinally of the cylinder and downwardly into the crankcase and being separated at the longitudinal edges thereof so that the edges of the valves are exposed to conditions in the crankcase, a vacuum producer having a suction inlet, and means interconnecting the suction inlet of said vacuum producer and the crankcase for reducing the pressure normally obtaining in the crankcase during operation of the engine whereby reduction of pressure in the crankcase is extended into the spaces between the longitudinal edges of the valves and thence simultaneously to the entire inner and outer surfaces of the valves from said longitudinal edges, and whereby said reduction of pressure on the surfaces of the valves is operative to inhibit passage of oil from the crankcase to the combustion chambers past the valves due to pressure differential normally obtaining in the crankcase and in said combustion chambers during reciprocation of the valves in use.

RALPH L. SKINNER.

References Cited in the file of this patent

UNITED STATES PATENTS

| Number | Name | Date |
| --- | --- | --- |
| 1,010,566 | Alltree | Dec. 5, 1911 |
| 1,236,187 | Lemp | Aug. 7, 1917 |
| 1,342,063 | Perry | June 1, 1920 |
| 1,421,858 | Thomas | July 4, 1922 |
| 1,427,337 | Tracy | Aug. 29, 1922 |
| 1,459,301 | Good | June 19, 1923 |
| 1,600,664 | Cavitt | Sept. 21, 1926 |
| 1,638,319 | Briggs | Aug. 9, 1927 |
| 1,646,298 | Litle | Oct. 18, 1927 |
| 1,669,977 | Evans | May 15, 1928 |
| 1,732,645 | Fekete | Oct. 22, 1929 |
| 1,800,479 | Skinner | Apr. 14, 1931 |
| 1,800,481 | Skinner | Apr. 14, 1931 |
| 1,821,991 | Skinner | Sept. 8, 1931 |
| 1,879,248 | Holloway | Sept. 27, 1932 |
| 2,092,235 | Whittington | Sept. 7, 1937 |
| 2,114,240 | Sharrard | Apr. 12, 1938 |

FOREIGN PATENTS

| Number | Country | Date |
| --- | --- | --- |
| 552,592 | France | Jan. 24, 1923 |

OTHER REFERENCES

Serial No. 412,524, Lautrette (A. P. C.), published May 11, 1943.